United States Patent
Muhleck

[11] 3,975,972
[45] Aug. 24, 1976

[54] ADJUSTABLE PEDAL CONSTRUCTION

[76] Inventor: Earl M. Muhleck, 20203 E. 8 Mile Road, St. Clair Shores, Mich. 48080

[22] Filed: Apr. 16, 1975

[21] Appl. No.: 568,630

[52] U.S. Cl. .................................. 74/560; 74/512; 74/529
[51] Int. Cl.² .......................................... G05G 1/14
[58] Field of Search .............. 74/560, 512, 516, 522

[56] References Cited
UNITED STATES PATENTS

| | | |
|---|---|---|
| 3,269,213 | 8/1966 | Buchwald ............................ 74/516 |
| 3,807,253 | 4/1974 | Belzile et al. ........................ 74/512 |
| 3,844,183 | 10/1974 | Wilke ................................. 74/512 X |

Primary Examiner—Samuel Scott
Assistant Examiner—F. D. Shoemaker

[57] ABSTRACT

The adjustable pedal construction may be used, as an example, as a brake pedal, clutch pedal, accelerator pedal, or any other type of pedal intended for use in a vehicle, which is manually or power operated, for actuating purposes. The pedal construction includes an upper pedal part assembly and a lower part pedal part assembly, with the upper pedal part assembly being conventionally pivoted on an existing vehicle pedal bracket thereby requiring no change in the corresponding brake, clutch or accelerator operating linkage. The upper and lower pedal part assemblies include plates which are pivotally connected by a pivot pin. A releasable latching, connecting or locking pin is interposed between the upper and lower pedal part assemblies to permit adjustment therebetween. The adjustable pedal construction has a normal operating position where the pedal parts are releasably locked together by the connecting pin and an inoperative position where the lower pedal part assembly is movable relative to the upper pedal part assembly after the connecting or latching pin has been released to permit adjustments between the assemblies to thereby make the pedal construction adaptable to fit the physical size, safety, comfort and convenience of the vehicle operator.

41 Claims, 12 Drawing Figures

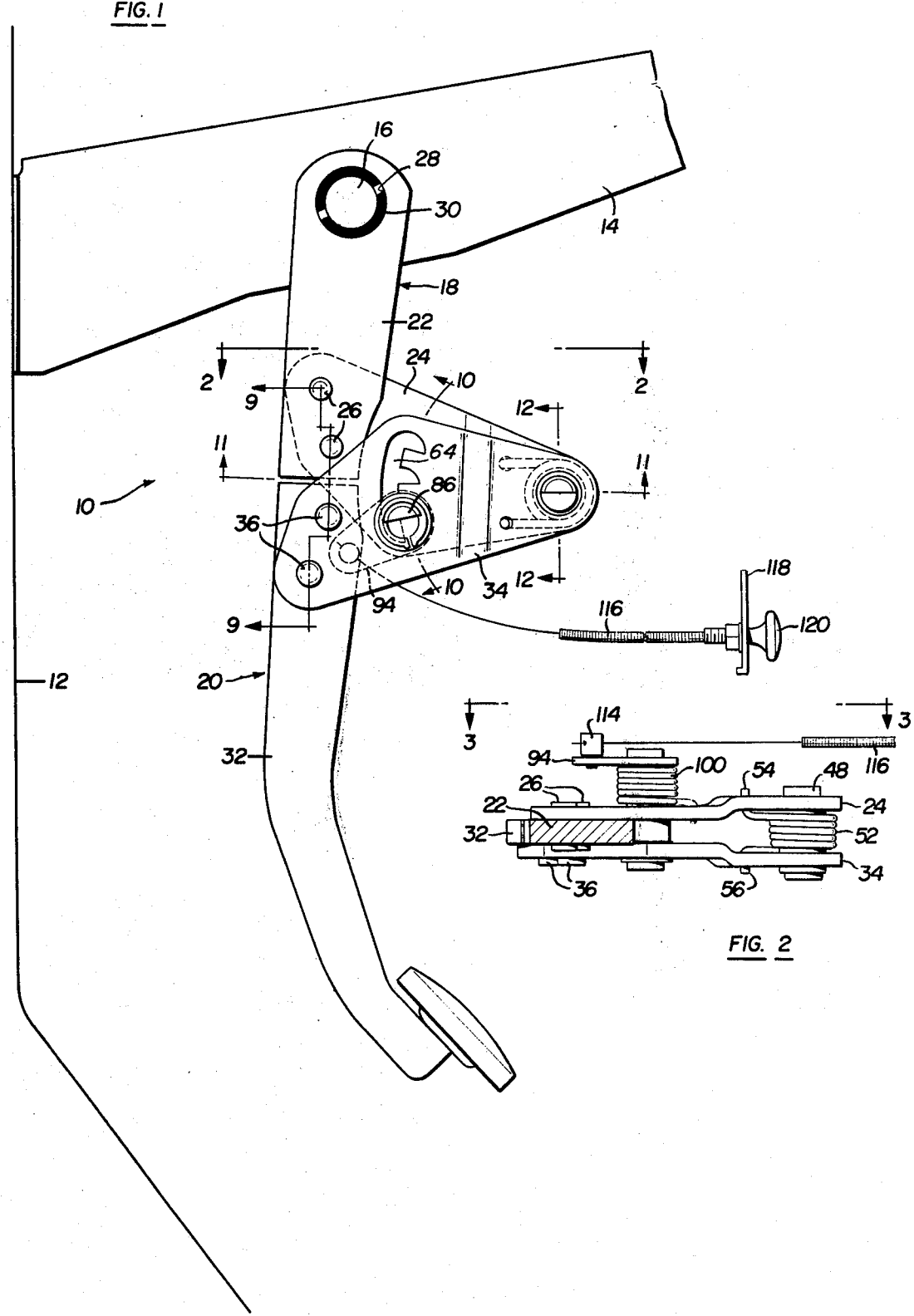

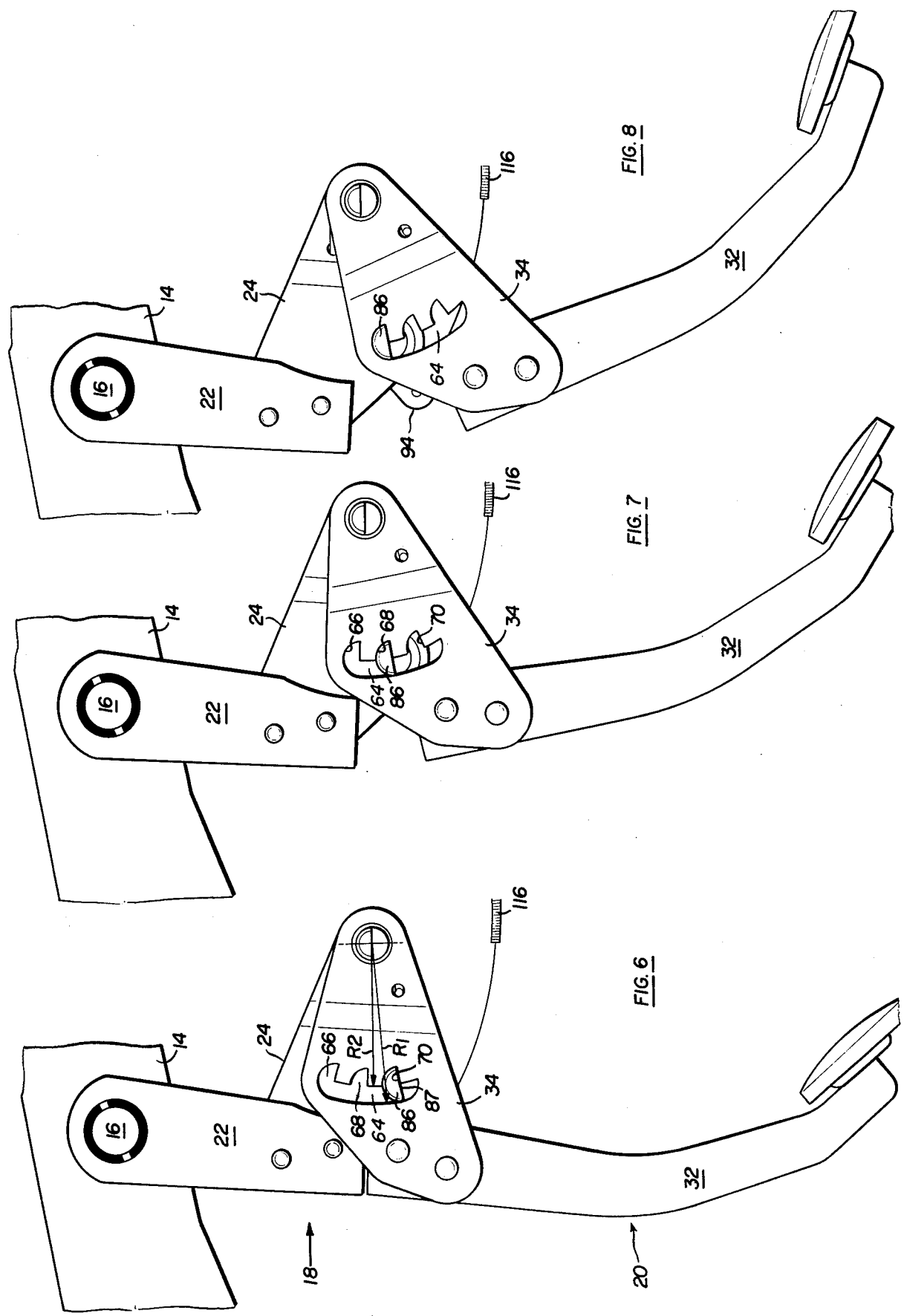

ADJUSTABLE PEDAL CONSTRUCTION

BACKGROUND OF THE INVENTION

1. Field of the Invention

The adjustable brake pedal construction or mechanism is primarily intended for use with motor vehicles such as automobiles, trucks, off the road type vehicles, etc. although is should be appreciated that it may be used with other vehicles which are manually or power operated.

2. Description of the Prior Art

The various pedals now utilized in automobiles are of one piece construction. In many vehicles the front seat of the vehicle is mounted on tracks and means are provided to permit the adjustment of the seat relative to the tracks to suit the size, convenience and comfort of the driver. Many persons believe that the use of movable seats in automobiles is a safety hazard and that during impact of the vehicle with an object it is possible for the seat to pull away from the tracks thereby resulting in serious injuries to the driver and/or passengers. Thus, it has been proposed that the front seat of the automobile be fixedly secured in the automobile, as an example, to the frame thus eliminating the adjustment between the seat and tracks. When a conventional pedal is used with a stationery seat, it is difficult for some persons to reach the pedal, thus creating a safety problem.

SUMMARY OF THE INVENTION

The adjustable pedal construction permits a driver of a vehicle, to adjust the brake, clutch and/or accelerator pedal(s) to a rearward position compatible with his or her physical size, safety, comfort and convenience by pulling a release knob located on the instrument panel of the vehicle.

The adjustable pedal construction or mechanism includes an upper pedal part assembly and a lower pedal part assembly, with the upper pedal part assembly being conventionally pivoted on the braking pivot in an existing pedal bracket of the vehicle without requiring any change in the corresponding brake, clutch or accelerator operating linkage.

As a feature of the present invention, the upper pedal part assembly provides a means for pivotally mounting the lower pedal part assembly thereon. In addition the upper pedal part assembly provides a means for releasably locking or latching the pedal part assemblies together as a unit for applying the associated mechanism. Each pedal part assembly includes a pedal part and a plate fixedly secured together.

Another feature of the present invention is the provision of an adjustment or pivot pin or connection between the plates of the assemblies to permit the lower pedal part to be adjusted relative to the upper pedal part.

Still another feature of the present invention is the provision of a tension or torsion retracting spring between the upper and lower plates to provide for automatic retraction of the lower pedal part upon the release of the latching or lacking pin. Such spring is normally located adjacent the aforementioned adjustment or pivot pin.

A further feature of the present invention is the provision of a rotatable lock pin carried by the upper plate and which is capable of locking or latching the pedal part assemblies together as a unit. With such a construction, the lock pin is rotatably set into the upper or hinge plate of the upper pedal part assembly. The lock pin is round or cylindrical where it extends through the upper or hinge plate and is half round or semicylindrical on both end portions thereof. One end portion of the lock pin extends through the lower or lock plate attached to the lower pedal part and forms a latching element. The lock plate includes an opening having a series of notches or recesses. The lock pin cooperates with another torsion spring which urges the latching element on the lock pin in a clockwise direction into the opposite notch of the lock plate to thereby latch and lock the assemblies together as a unit.

A still further feature of the invention is in providing a lever which is attached to the other end portion of the lock pin. A cable is attached to the lever and is routed to the instrument panel of the vehicle where it is provided with a release knob. When the knob is pulld the lever and the lock pin are rotated in a counterclockwise direction thereby withdrawing the latching element and permitting the lower pedal part actuated by the tension of the retracting spring to swing to the rearmost position by passing lock notches or recesses provided in the lock plate.

Another feature of the invention is that the lock plate, as an example, is provided with three notches to engage the half round latching element or portion of the lock pin. When the lower pedal part is in its extreme rearward position and the pull cable is released, the operator may push the pedal forward and the flat side of the latching element or portion of the lock pin will engage the next notch or recess of the lock plate thereby connecting the upper and lower pedal parts together as a unit through the hinge and lock plates and associated components.

A further feature of the invention is that a single cable may be routed to the instrument panel which can control all pedals although there may be a separate cable for each pedal. Pulling the cable by means of the release knob rotates the lock pin and permits the pedal(s) to swing rearward. As a result thereof, with the pedal construction in a locked position, it is impossible for the pedal to malfunction or slip since the harder the force applied thereto the more positive the lock. An adjustment of pedal travel up to four or more inches is possible.

As a further feature of the invention the adjustment pivot pin, which connects the hinge and pivot plates together, is distinct in location from the conventional braking pivot. This results in a basic design feature which assures that the pedal adjustment will always result in the proper pedal to floor relationship.

DESCRIPTION OF THE DRAWINGS

FIG. 1 is a side elevational view of the adjustable pedal construction mounted in the interior of an automobile, with the pedal construction being located in its extreme forward position;

FIG. 2 is a plan view, partly in section, taken on the line 2—2 of FIG. 1;

FIG. 6 is a side elevational view of the adjustable pedal construction in its extreme forward position (closest to the fire wall of the vehicle) and is similar to FIG. 1, with certain of the parts removed for clarity purposes;

FIG. 7 is a side elevational view of the adjustable pedal construction, with certain parts removed for clarity purposes, and showing the pedal construction in an intermediate position;

FIG. 8 is a side elevational view similar to FIGS. 6 and 7, with certain parts removed for clarity purposes, and illustrating the pedal construction in its rearwardmost position which is remote from the fire wall of the vehicle;

DESCRIPTION OF A PREFERRED EMBODIMENT

Figure 3:
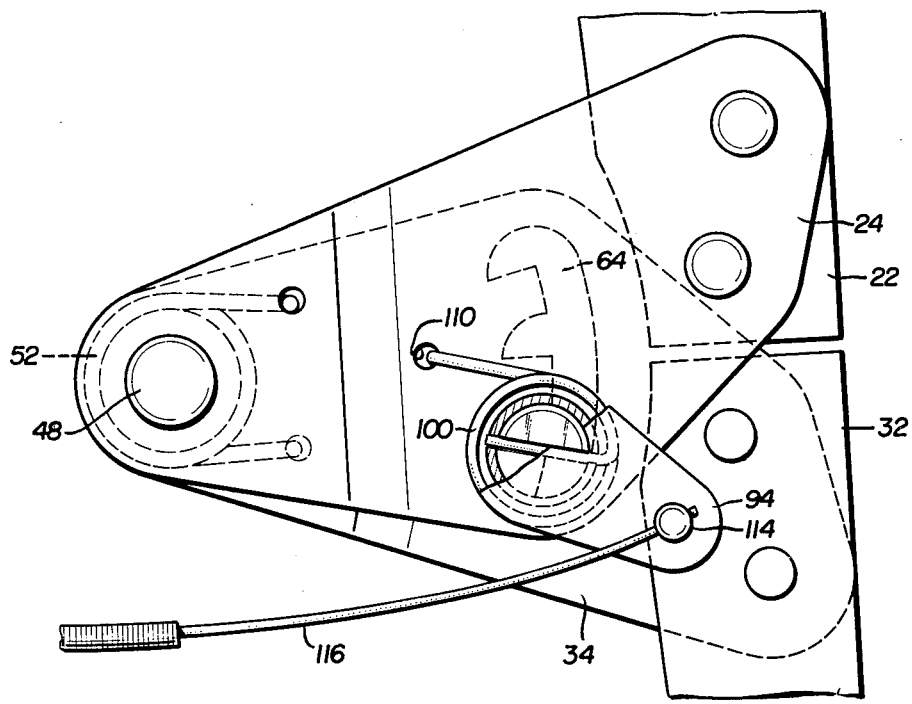
FIG. 3 is a fragmentary elevational view, taken on the line 3—3 of FIG. 2 and illustrating the rotatable lock pin in a locked position with the lock plate.

The adjustable pedal construction 10 is described herein as applied as a brake pedal which is attached to the existing brake linkage, not shown, of an automobile or vehicle. It should be appreciated, however, that the pedal construction 10 may be used as a clutch pedal, accelerator pedal or any other type of pedal intended for use in a vehicle, which is manually or power operated, for actuating purposes. When the adjustable pedal construction 10 is attached to the existing linkage mechanism, the pedal construction acts as a unitary lever or pedal, thus permitting the brakes (or other mechanism with which it is associated) to be applied in the conventional manner.

The adjustable pedal construction 10 is mounted in the vehicle underneath the dashboard, not shown, on the passenger side of the fire wall 12. The vehicle includes an existing pedal bracket or support 14 from which the conventional brake pedal is pivotally supported. The adjustable pedal construction 10 of the present invention is mounted to the vehicle's bracket 14 in the same manner as the conventional or standard brake pedal.

The bracket 14 is provided with the conventional braking pivot, post or pin 16 upon which the adjustable pedal construction 10 is pivoted. The pedal construction 10 includes an upper pedal part assembly 18 and a lower pedal part assembly 20, with each assembly 18, 20 including a pedal part and a plate or bracket to be subsequently described. The pedal parts of the upper and lower assemblies 18 and 20 may be manufactured separately as original equipment or may be constructed by separating or cutting an existing or conventional unitary pedal into two parts, as an example, along line 11—11 of FIG. 1. It is contemplated that when an adjustable pedal construction 10 is installed in an existing vehicle, that the pedal which it replaces will be returned to the manufacturer's plant for subsequent processing (by dividing it into two parts) and use in an adjustable pedal construction 10 to be manufactured.

The upper pedal part assembly 18 consists of an upper pedal part 22 and a hinge plate or bracket 24 which is connected to the upper pedal part 22 by a pair of rivets 26. With such a construction the hinge plate 24 is stationary with respect to pedal part 22. The upper end of pedal part 22 is provided with an opening 28 in which is received a conventional tubular bushing 30 (FIG. 1) which is secured to the pedal part 22. The bushing 30 telescopes on the bushing pivot, pin or post 16 in a conventional manner thereby permitting the adjustable pedal construction 10 to rotate or pivot on the post 16 when applying the brakes.

Figure 9:
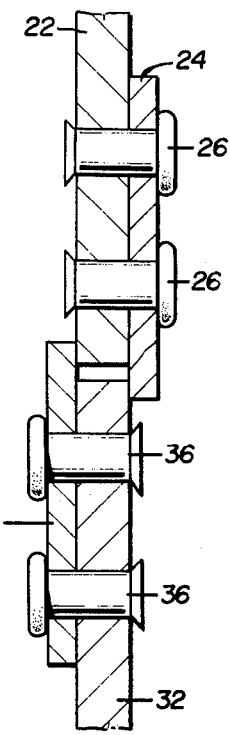
FIG. 9 is a sectional view taken on the line 9—9 of FIG. 1.

The lower pedal part assembly 20 comprises a lower pedal part 32 and a pivot plate or bracket 34 which is secured to the pedal part 32 by a pair of rivets 36 (FIG. 9). With such a construction the pivot plate 34 is stationary with respect to the lower pedal part 32.

Figure 11:
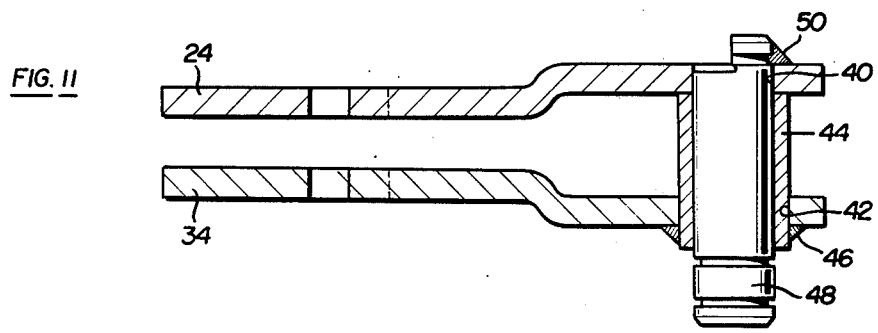
FIG. 11 is a sectional view taken on the line 11—11 of FIG. 1.

As shown in FIGS. 2 and 11, the plates 24, 34 are arranged in spaced apart relation, with the ends thereof remote from the fire wall 12 being provided with openings for receiving an adjustment pivot pin or post. Specifically the hinge plate 24 is provided with an opening 40, while the pivot plate 34 is provided with an opening 42 which is larger than the opening 40. A bushing 44 extends through opening 42 and has one end abutting the hinge plate 24 (FIG. 11), with the other end thereof extending exteriorly of pivot plate 34 and is secured thereto, as an example, by weld 46. An adjustment pivot pin or post 48, to be subsequently described, extends completely through the bushing 44 and has one end secured to the hinge plate 24, as an example, by weld 50. The adjustment pin 48 is distinct in location from the conventional braking pivot 16. This results in a basic design feature which assures that the pedal adjustment will always result in the proper pedal to floor relationship.

Figure 12:
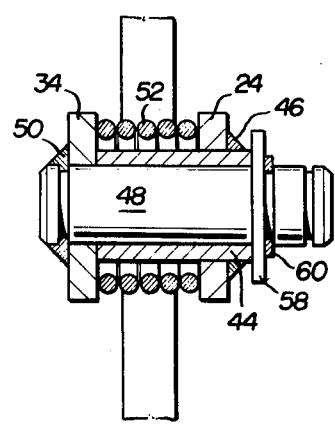
FIG. 12 is a sectional view taken on the line 12—12 of FIG. 1.

A coil or torsion retracting spring 52 surrounds pivot bushing 44 (FIG. 2 and 12) in the space between plates 24, 34. The spring 52 has at the ends thereof a pair of oppositely turned arms or tabs 54, 56 (FIG. 2) which extend through and are anchored in openings provided in plates 34, 24 respectively. The retracting spring 52 is designed to hold the plates 24, 34 in a predetermined relationship and provides for automatic retraction of the lower pedal part 32 as will subsequently appear. A washer 58 is provided on pin 48, abuts the bushing 44 and is held on pin 48 by a snap ring 60 (FIG. 12).

The pivot plate 34 is provided with an elongated opening 64 (FIGS. 1, 6, 7 and 8) formed on the radiuses $R_1$ & $R_2$ measured from the axis of the pin 48. The elongated opening 64 which is generally rounded or curved at the top and bottom ends, it provided with a plurality of notches or recesses 66, 68 and 70 which are selectively adapted to receive a lock pin to be subsequently described. Each notch 66, 68 and 70 is in the form of a quadrant of a circle as shown in the drawings. The notches 66, 68 and 70 extend completely through pivot plate 34 from one side to the other (FIG. 10).

Figure 10:
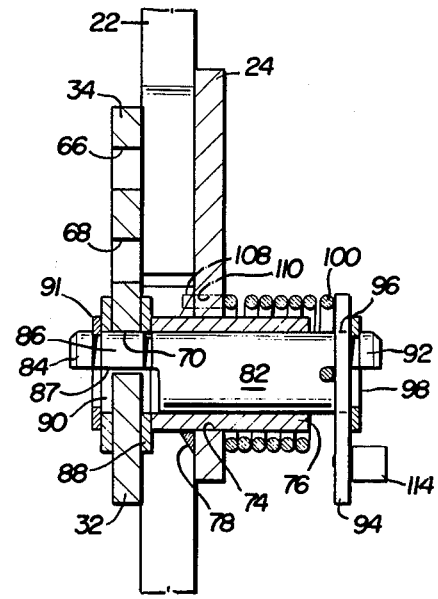
FIG. 10 is a sectional view taken on the line 10—10 of FIG. 1.

The hinge plate 24 is provided with an opening 74 through which a bushing 76 extends (FIG. 10). The bushing 76 is secured to hinge plate 24, as an example, by weld 78. Thus both bushings 44 and 76 are secured to the hinge plate 24. The bushing 76 has an end which is spaced from pivot plate 34 and provided in that space is a washer to be subsequently described. The other end of bushing 76 extends beyond hinge plate 24 as shown in FIG. 10. A lock pin or post 82 extends through the bushing 76.

The lock pin 82 is of generally cylindrical configuration except at the end portions thereof where portions are cut away to provide end portions of generally semicylindrical configurations. One end portion 84 defines a latching or locking element or tooth 86 of semi-cylindrical configuration having a flat surface 87. The latching element or tooth 86 including the flat surface 87 is constructed and arranged to fit partially in one of the notches 66, 68 or 70 as shown in FIGS. 6, 7 and 8. Thus the notches 66, 68 and 70 are shaped to fit one half portion of the latching element or tooth 86.

A pair of identical washers 88 and 90, each having a semi-cylindrical shaped opening, located off center, are mounted on the end portion 84 of the lock pin 82 on opposite sides of the pivot plate 34 (FIG. 10), with the bushing 76 abutting washer 88. A suitable snap ring 91 is used to retain washer 90 on the pin 82.

The other end 92 of the pivot pin 82 is also of generally semi-cylindrical configuration. An operating lever 94 having a generally semi-cylindrical shaped opening 96, located off center, is mounted and held on the end portion 92 of the pin 82 by means of a snap ring 98.

Figure 5:
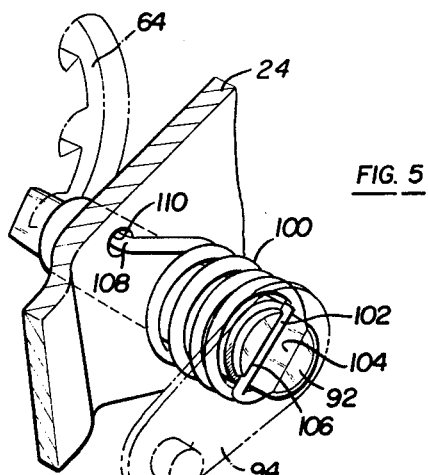
FIG. 5 is a fragmentary perspective view, partly in section, illustrating the rotatable lock pin, operating lever and coil spring components of the pedal construction.

A coil spring 100 surrounds the bushing 76 and lock pin 82 between the hinge plate 24 and lever 94. The spring 100 has at one end a radially turned arm 102 (FIG. 5) which extends across the flat surface 104 on the semi-cylindrical end portion 92 of lock pin 82 and is anchored thereon by any suitable means such as engagement between the arm 102 and a notch 106 in the pin 82. The coil spring 100 is provided on the other end thereof with an axially extending arm 108 which extends through and is located in an opening 110 provided in the hinge plate 24.

The lever 94 is provided on the free end thereof with a knob, element or anchor 114 to which an operating cable 116 is connected. The cable 116 extends between the lever 94 and the vehicle's panel part 118 (FIG. 1), which may be part of the dashboard. A release knob 112 is provided on the cable end located in the interior of the vehicle. The cable 116 and the manner of mounting same on the panel 118 may take various forms. It is desirable that the driver of the vehicle pull the release knob 120 and cable 116 towards himself in a straight line in order to rotate lever 94 in a counterclockwise direction (FIG. 1) as will be further explained.

In view of the foregoing it appears that the lower pedal part assembly 20 consisting of pedal part 32 and pivot plate 34 is pivotally and adjustably connected to the upper pedal part assembly 18 consisting of pedal part 22 and the hinge plate 24. The upper pedal part assembly 18 carries the rotatable lock pin 82 which is rotated by the lever 94 when actuated by the pull cable 116.

When the rotatable lock pin 82, which is set in the upper pedal part assembly 18, is orientated relative to the notches 66, 68 and 70, the coil or torsion spring 100 biases the latching portion or element 86 into the notch opposite therefrom. In order to remove the latching element 86 from one of the notches it is necessary to pull the release knob 120 and cable 116 towards the operator thereby rotating the lever 94 in a counterclockwise direction (FIG. 1) against the force of the torsion spring 100. The rotation of lever 94 is effective to rotate the pin 82 in a counterclockwise direction and to withdraw the latching element 86 from notch 70.

Thereafter, with the knob 120 held out, the retracting spring 52 automatically biases the lower pedal part assembly 20 towards the rearward position of FIG. 8. If a force is applied by the driver foot to the lower pedal part 32, such force acts against spring 52. Thus the operator can control the movement of the pedal part 32 and the influence of spring 52. When the force applied by the driver is removed and the knob 120 is released, the spring 100 will urge the latching element 86 on pin 82 into opposite notch (notch 68, FIG. 7 or notch 66, FIG. 8).

The axes of pins 82 and 48 are fixed and parallel at all times. Pin 48 is fixedly held by pivot plate 34 against rotation. Pin 82 is rotatably mounted as noted previously. The axes of pins 82 and 48 are spaced apart a fixed distance at all times.

Pivot pin 48 may be of cylindrical configuration throughout its entire length or it may be of the same identical configuration as the lock pin 82.

In operation, with the pedal construction 10 in its extreme forward position as shown in FIGS. 1 and 6, when it is required to adjust the lower pedal part assembly 20, the operator pulls release knob 120 and cable 116 towards him thereby rotating lever 94 in a counterclockwise direction as viewed in FIG. 1. Rotation of lever 94 rotates the lock pin 82 in a counterclockwise direction, thereby withdrawing the latching element 86 from notch 70. With the release knob 120 held out, the retracting spring 52 returns the lower pedal part 32 to the rearwardmost position of FIG. 8. Upon the release of the knob 120, the locking spring 82 forcibly urges the latching element 86 in a clockwise direction into the opposite notch or recess 66 as shown in FIG. 8.

When the operator requires an intermediate position, a force is applied to the foot pedal 32 by the operator while at the same time the knob 120 is held out to disengage the latching element 86 from the pivot plate 34. The force applied to the pedal part 32 by the operator opposes the action of the retracting spring 52. After the pedal part has traveled part of the permissible travel, the release knob 120 and cable 116 are released by the operator. Thereafter the locking spring 100 urges the latching element 86 in a clockwise direction into notch 68 as shown in FIG. 7.

In a pedal construction constructed according to the present invention, the amount of pedal adjustment incorporated therein depends upon the requirements of the particular vehicle with which the pedal construction is utilized. As an example, the pedal construction 10 may employ four or more inches of adjustment between the forward position of FIG. 6 and the rearwardmost position of FIG. 8.

It is contemplated that the pedal construction may have a plurality of intermediate positions between the extreme forward and rearwardmost positions.

A single cable 116 with the release knob 120 may be used to operate a series of pedals, as an example, an adjustable accelerator pedal, an adjustable brake pedal and an adjustable clutch pedal or any combination thereof or a separate cable may be employed for each adjustable pedal construction. Each cable would be routed to the instrument panel as disclosed herein.

Figure 4:
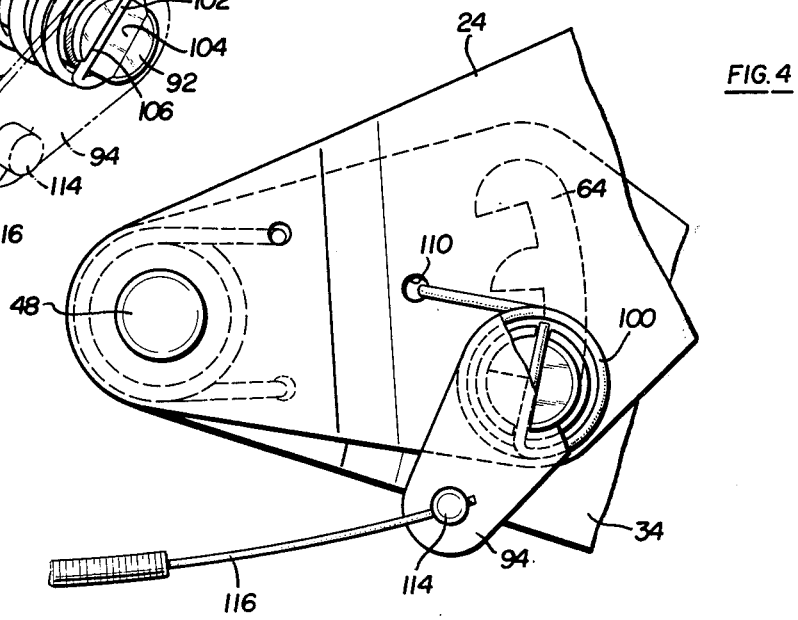
FIG. 4 is a fragmentary elevational view, similar to FIG. 3, showing the rotatable lock pin in an unlocked position with the lock plate.

The adjustable pedal construction 10 has a plurality of operating or adjusted positions, as shown in FIGS. 6, 7 and 8, where the pedal parts 22, 32 are releasably locked together, with the lock pin 82 in one of the notches 66, 68, 70. Each notch 66, 68, 70 corresponds to one operating or adjusted position of the adjustable pedal construction. The pedal construction 10 includes an unlocked position (FIG. 4) which is when the lock pin 82 is out of engagement with a notch 66, 68, 70, with the lower pedal part 32 and pivot plate 34 movable with respect to the upper pedal part 22 and the hinge plate 24 when selecting another operating position.

What is claimed is:

1. An adjustable pedal construction comprising an upper pedal part and a lower pedal part, said upper pedal part being adapted to be pivotally mounted on a support, and adjustable connecting means interposed between and connected to opposing end portions of said pedal parts, said adjustable pedal construction having a plurality of operating positions where said pedal parts are releasably locked together in a selected one of said operating positions by said connecting means, said adjustable pedal construction having an unlocked position where said lower pedal part is movable relative to said upper pedal part upon release of said connecting means to permit adjustment between said parts when selecting another of said operating positions, the parts of said pedal construction being adapted to pivot as a unit when said adjustable pedal construction is in one of said operating positions.

2. An adjustable pedal construction comprising an upper pedal part and a lower pedal part, said upper pedal part being adapted to be pivotally mounted on a support, and adjustable connecting means interposed between and connected to opposing end portions of said pedal parts, said adjustable pedal construction having a first position where said pedal parts are releasably locked together by said connecting means and having a second position where said lower pedal part is movable relative to said upper pedal part upon release of said connecting means to permit adjustment between said parts, the parts of said pedal construction being adapted to pivot as a unit when said adjustable pedal construction is in said first position, said adjustable connecting means comprising a pair of plates, means fixedly connecting one of said plates to said upper pedal part, means fixedly connecting the other of said plates to said lower pedal part, said other plate including an opening provided with one or more recesses, a pivot pin carried by said plates for permitting said other plate to be rotated with respect to said one plate, a lock pin rotatably carried by said one plate and having a latch portion on one end thereof extending through the opening in said other plate, resilient means biasing said lock pin in a direction to urge said latch portion into a recess, and means for rotating said lock pin to withdraw said latch portion from the recess.

3. The adjustable pedal construction defined in claim 2 wherein said last mentioned means includes a lever fixed on one end thereof to said lock pin and a cable attached to the other end of said lever for rotating said lever and withdrawing said latch portion of said lock pin from the recess.

4. The adjustable pedal construction defined in claim 3 wherein said resilient means is in the form of a spring.

5. The adjustable pedal construction defined in claim 3 wherein said resilient means is in the form of a coil spring coaxially surrounding the axis of said lock pin and having one end of said spring connected to said lock pin and the other end of said spring connected to said one plate.

6. The adjustable pedal construction defined in claim 2 wherein additional resilient means is interposed between said plates adjacent said pivot pin for biasing said lower pedal part to a predetermined position upon the withdrawal of said latch portion of the lock pin from a recess.

7. The adjustable pedal construction defined in claim 6 wherein said additional resilient means is in the form of a coil spring surrounding the axis of said pivot pin, said last mentioned spring being located between said plates and having the ends thereof carried by said plates.

8. The adjustable pedal construction defined in claim 2 wherein said pivot pin is non-rotatable.

9. The adjustable pedal construction defined in claim 2 wherein the axes of said pivot and lock pins are parallel at all times.

10. The adjustable pedal construction defined in claim 2 wherein said pivot and lock pins are of identical construction.

11. The adjustable pedal construction defined in claim 2 wherein said pins are parallel and are spaced apart a fixed distance at all times.

12. The adjustable pedal construction defined in claim 2 wherein said lock pin includes an intermediate portion of generally cylindrical configuration and a pair of end portions, each end portion being of generally semi-cylindrical configuration, one of said end portions forming said latch portion which is received by a recess in said other plate.

13. The adjustable pedal construction defined in claim 12 wherein said last mentioned means includes a lever fixed on one end thereof to the other of said end portions of said lock pin, said lever having a generally semi-cylindrical shaped opening for receiving said other end portion of said lock pin, and a cable attached to the other end of said lever for rotating said lever and said lock pin thereby withdrawing said latch portion of said lock pin from the recess.

14. The adjustable pedal construction defined in claim 13 wherein said cable is provided with a knob to assist in pulling the cable for rotating the lever and said lock pin thereby withdrawing said latch portion from the recess.

15. The adjustable pedal construction defined in claim 14 wherein additional resilient means is interposed between said plates adjacent said pivot pin for biasing said lower pedal part to a predetermined position upon the withdrawal of said latch portion of the lock pin from the recess.

16. The adjustable pedal construction defined in claim 14 wherein said additional resilient means is in the form of a coil spring surrounding the axis of said pivot pin, said last mentioned spring being located between said plates and having the ends thereof carried by said plates.

17. The adjustable pedal construction defined in claim 16 wherein after said cable is actuated to withdraw said latch portion from the recess, a force is applied to said lower pedal part in a direction opposing the force of said additional resilient means effective to rotate same along with said other plate relative to said one plate and to said upper pedal part to thereby present another recess opposite said lock pin for reception of said latch portion.

18. The adjustable pedal construction defined in claim 14 wherein each of said pins are carried by a bushing secured to said one plate.

19. The adjustable pedal construction defined in claim 18 wherein one end of one of said bushings extends through said one plate and is secured thereto, with the other end thereof abutting said other plate, said pivot pin being secured to said one plate.

20. The adjustable pedal construction defined in claim 18 wherein the other bushing extends through said one plate and is secured thereto, one end of said other bushing being spaced from said other plate.

21. The adjustable pedal construction defined in claim 20 wherein a pair of spaced apart washers are provided on said one end portion of said lock pin, said washers abutting opposite sides of said other plate, said washers being provided with semi-cylindrical shaped openings for receiving said one end portion of said lock pin.

22. The adjustable pedal construction defined in claim 1 wherein said adjustable connecting means comprises a pair of plates, means fixedly connecting one of said plates to said upper pedal part, means fixedly connecting the other of said plates to said lower pedal part, said other plate including an opening provided with a plurality of recesses, one recess for each of said operating positions, a pivot pin carried by said plates for permitting said other plate to be rotated during said unlocked position with respect to said one plate, a lock pin rotatably carried by said one plate and having a latch portion on one end thereof extending through the opening in said other plate, resilient means biasing said lock pin in a direction to urge said latch portion into the recess of the selected operating position, and means for rotating said lock pin to withdraw said latch portion from the recess of the selected operating position.

23. The adjustable pedal construction defined in Claim 22 wherein said last mentioned means includes a lever fixed on one end thereof to said lock pin and a cable attached to the other end of said lever for rotating said lever and withdrawing said latch portion of said lock pin from the recess of the selected operating position.

24. The adjustable pedal construction defined in claim 23 wherein said resilient means is in the form of a spring.

25. The adjustable pedal construction defined in claim 23 wherein said resilient means is in the form of a coil spring coaxially surrounding the axis of said lock pin and having one end of said spring connected to said lock pin and the other end of said spring connected to said one plate.

26. The adjustable pedal construction defined in claim 22 wherein additional resilient means is interposed between said plates adjacent said pivot pin for biasing said lower pedal part to another operating position upon the withdrawal of said latch portion of the lock pin from the recess of the selected operating position.

27. The adjustable pedal construction defined in claim 26 wherein said additional resilient means is in the form of a coil spring surrounding the axis of said pivot pin, said last mentioned spring being located between said plates and having the ends thereof carried by said plates.

28. The adjustable pedal construction defined in claim 22 wherein said pivot pin is non-rotatable.

29. The adjustable pedal construction defined in claim 22 wherein the axes of said pivot and lock pins are parallel at all times.

30. The adjustable pedal construction defined in claim 22 wherein said pivot and lock pins are of identical construction.

31. The adjustable pedal construction defined in claim 22 wherein said pins are parallel and are spaced apart a fixed distance at all times.

32. The adjustable pedal construction defined in claim 22 wherein said lock pin includes an intermediate portion of generally cylindrical configuration and a pair of end portions, each end portion being of generally semi-cylindrical configuration, one of said end portions forming said latch portion which is received by the recess of the selected operating position.

33. The adjustable pedal construction defined in claim 32 wherein said last mentioned means includes a lever fixed on one end thereof to the other of said end portions of said lock pin, said lever having a generally semi-cylindrical shaped opening for receiving said other end portion of said lock pin, and a cable attached to the other end of said lever for rotating said lever and said lock pin thereby withdrawing said latch portion of said lock pin from the recess of the selected operating position.

34. The adjustable pedal construction defined in claim 33 wherein said cable is provided with a knob to assist in pulling the cable for rotating the lever and said lock pin thereby withdrawing said latch portion from the recess of the selected operating position.

35. The adjustable pedal construction defined in claim 34 wherein additional resilient means is interposed between said plates adjacent said pivot pin for biasing said lower pedal part to a predetermined position upon the withdrawal of said latch portion of the lock pin from the recess of the selected operating position.

36. The adjustable pedal construction defined in claim 34 wherein said additional resilient means is in the form of a coil spring surrounding the axis of said pivot pin, said last mentioned spring being located bertween said plates and having the ends thereof carried by said plates.

37. The adjustable pedal construction defined in claim 36 wherein after said cable is actuated to withdraw said latch portion from the recess, a force is applied to said lower pedal part in a direction opposing the force of said additional resilient means effective to rotate same along with said other plate relative to said one plate and to said upper pedal part to thereby present a recess at another operating position opposite said lock pin for reception of said latch portion.

38. The adjustable pedal construction defined in claim 34 wherein each of said pins are carried by a bushing secured to said one plate.

39. The adjustable pedal construction defined in claim 38 wherein one end of one of said bushings extends through said one plate and is secured thereto, with the other end thereof abutting said other plate, said pivot pin being secured to said one plate.

40. The adjustable pedal construction defined in claim 38 wherein the other bushing extends through said one plate and is secured thereto, one end of said other bushing being spaced from said other plate.

41. The adjustable pedal construction defined in claim 40 wherein a pair of spaced apart washers are provided on said one end portion of said lock pin, said washers abutting opposite sides of said other plate, said washers being provided with semi-cylindrical shaped openings for receiving said one end portion of said lock pin.

\* \* \* \* \*